(12) United States Patent
Tan (10) Patent No.: US 11,765,002 B2
(45) Date of Patent: Sep. 19, 2023

(54) EXPLICIT SOLUTION FOR DFE OPTIMIZATION WITH CONSTRAINTS

(71) Applicant: Tektronix, Inc., Beaverton, OR (US)

(72) Inventor: Kan Tan, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 17/825,981

(22) Filed: May 26, 2022

(65) Prior Publication Data

US 2022/0393914 A1 Dec. 8, 2022

Related U.S. Application Data

(60) Provisional application No. 63/194,293, filed on May 28, 2021.

(51) Int. Cl.
*H04L 25/03* (2006.01)

(52) U.S. Cl.
CPC .......... *H04L 25/03057* (2013.01); *H04L 2025/03471* (2013.01)

(58) Field of Classification Search
CPC ......... H04L 25/03006; H04L 25/03019; H04L 25/03057; H04L 25/03855; H04L 2025/03433; H04L 2025/03471; H04L 2025/03592; H04L 2025/03611
USPC ......... 375/232, 233, 348, 350; 708/322, 323
See application file for complete search history.

(56) References Cited

U.S. PATENT DOCUMENTS

| | | | | |
|---|---|---|---|---|
| 10,516,427 | B2* | 12/2019 | Hossain | H04L 25/03057 |
| 2002/0110188 | A1* | 8/2002 | Ohmori | H04L 25/03038 |
| | | | | 375/232 |
| 2013/0243070 | A1* | 9/2013 | Ito | H04L 27/01 |
| | | | | 375/233 |
| 2022/0373598 | A1* | 11/2022 | Tan | G01R 31/318371 |

FOREIGN PATENT DOCUMENTS

CN 113992484 A * 1/2022

* cited by examiner

*Primary Examiner* — Young T. Tse
(74) *Attorney, Agent, or Firm* — Miller Nash LLP; Andrew J. Harrington (57) ABSTRACT

A method of equalizing a communication link includes setting a number of coefficients to a required number, determining a number of pulse responses for a waveform, setting all values in a set of values to zero, repeating, until all values have been assigned, determining a current lowest parameter, using a position of the current lowest parameter as an index, determining a minimum value between a first term multiplied by a main pulse response minus a summation of each parameter multiplied by each value, divided by the current lowest parameter, and a corresponding pulse response, and assigning the minimum value to the value having a position equal to the position of the current lowest parameter, and determining a value of each coefficient in a set of coefficients by multiplying each value with the sign of a corresponding pulse response; defining an equalizer having a number of taps having a value based on the corresponding coefficient; and applying the equalizer to a waveform.

20 Claims, 8 Drawing Sheets

EXPLICIT SOLUTION FOR DFE OPTIMIZATION WITH CONSTRAINTS

CROSS-REFERENCE TO RELATED APPLICATIONS

This disclosure claims benefit of U.S. Provisional Application No. 63/194,293, titled "EXPLICIT SOLUTION FOR DFE OPTIMIZATION WITH CONSTRAINTS," filed on May 28, 2021, the disclosure of which is incorporated herein by reference in its entirety.

TECHNICAL FIELD

This disclosure relates to optimization of equalizers used for electronic signals and optical signals, more particularly to optimization of decision feedback equalizers used in standard signaling protocols, with constraints.

BACKGROUND

High-speed communication links between transmitters and receivers, generally, operate at speeds of 6 Gigabits/second (Gb/s). At such high speeds, either the transmitter or receiver or both will typically employ equalization techniques to correct for degradation of the signal. Degradation of the signal may result from channel loss, reflection, cross talk, and noise to name a few. Equalizing the signal typically means removal, or filtering, of undesirable components from the signal, and amplifying signal.

The equalizations take on of many commonly use various techniques, including decision feedback equalizers (DFE). DFEs equalize an incoming signal typically by applying the feedback path using past decisions to mitigate the impact from the inter-symbol interference (ISI). DFEs use different coefficients, usually referred to as "taps," to mitigate the impacts from the signal impairments.

Different communication standards have different equalization requirements, typically set out as the number of DFE taps and limits and constraints on the taps. Optimizing the taps for a given equalizer typically involves iterative search processes or involves sweeping the solution space. These processes typically act slowly and have low accuracy.

DESCRIPTION

Figure 1:
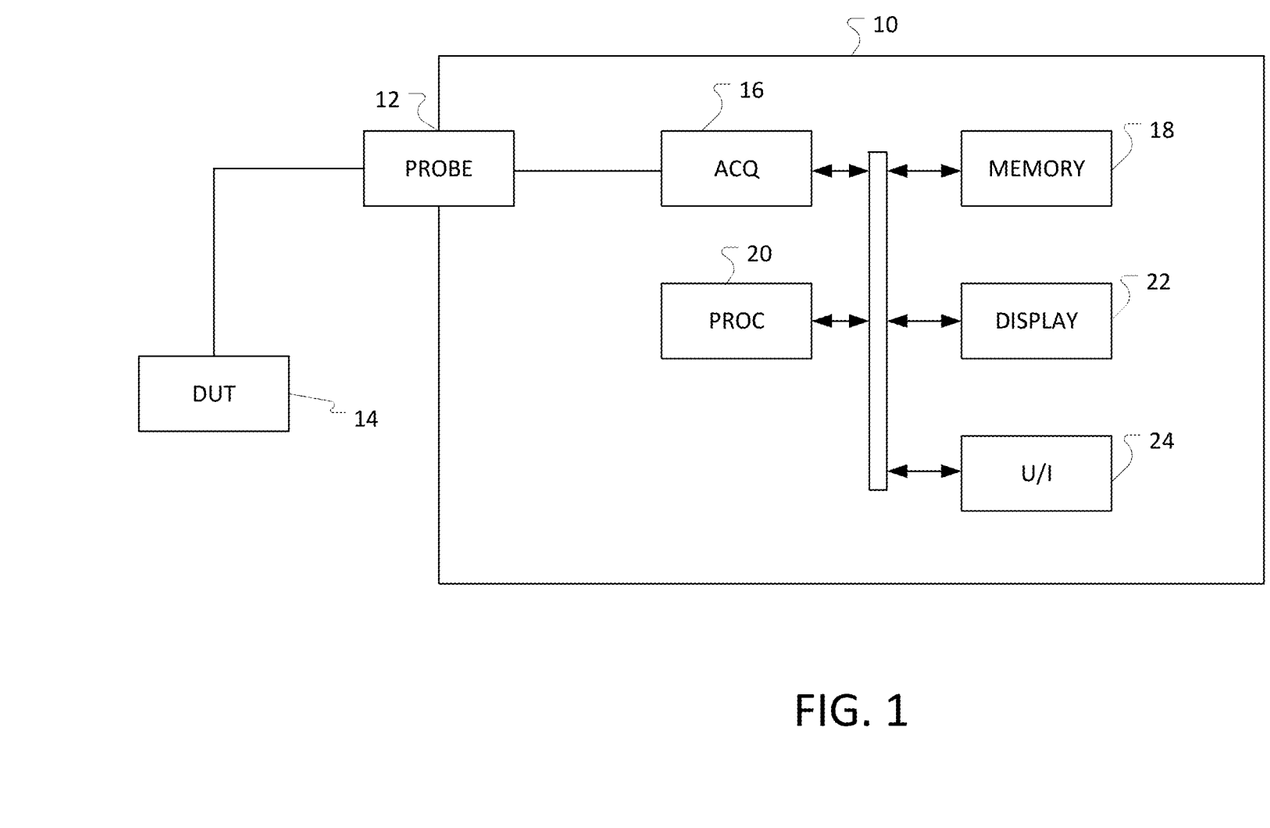
FIG. 1 shows an embodiment of a device having a communication link that employs equalization.

Embodiments here provide a method of equalizing a communication link, such as that shown in FIG. 1. The equalization may occur in the transmitter, the receiver or both, to improve system performance. As transmission speeds increase, the amount of equalization necessary increases as well. DFEs may have a different number of taps used to mitigate the signal degradations and impairments, generally involving more taps for higher speeds.

Peripheral Component Interface Express (PCIE) is one example of a communications protocol or standard employing DFEs. PCIE generally comprises an architecture input/output interconnect used in a wide variety of computing and communications platforms. The below discussion focuses on this particular communications protocol standard and its explicit requirements. One should note that these specific requirements provide an example of design requirements and constraints, but one can extrapolate those to apply to other communications protocol requirements.

In the PCIE example, each successive generation from the third generation to the sixth has had an increase in the transmission speed as shown below. Note that the unit for transmission speed in the list is GigaTransfers/sec (GT/s).

| PCIE generation | Transmission speed | Number of DFE taps | Signal modulation |
|---|---|---|---|
| Gen3 | 8 GT/s | 1 | NRZ |
| Gen4 | 16 GT/s | 2 | NRZ |
| Gen5 | 32 GT/s | 3 | NRZ |
| Gen6 | 64 GT/s (32GBaud) | 16 | PAM4 |

FIG. 1 shows an embodiment of a computing device. This device may comprise a test and measurement device, such as an oscilloscope. The oscilloscope generally will be coupled by a probe 12 to a DUT 14. The oscilloscope can also connect to the DUT through a cable or a fixture. The DFE and its related optimization may occur within the oscilloscope 10 or between the oscilloscope 10 and the DUT 14. Either of these may act as a receiver or transmitter endpoint of a high-speed transmission link that would employ PCIE Gen6. The oscilloscope may include a probe interface and an acquisition system 16 that may include many different types of circuitry that receive and operate on the analog signal from the DUT. Examples may include analog-to-digital converter(s), preamplifiers, etc. A memory 18 may receive this information for storage. Memory 18 may also contain executable code, that when executed by a processor 20, cause the processor to perform the methods discussed below. The display 22 would display the resulting waveform(s) and the user interface 24 may include dials, knobs, keys, and may include a portion of the display as a touch sensitive screen, to allow a user to set up and run tests on a transmitter or receiver in accordance with a user-defined test.

The computing device may not necessarily comprise a test and measurement device. Many computing devices that have a communication bus that uses communication protocols such as PCIE as an interface between the main computer processor and other components such as displays, memory and other accessories. The processor in the computing device may operate to optimize the coefficients for the DFE taps. The device may comprise an endpoint of a high-speed communication link, whether a test and measurement device that tests the equalizer or a computing device operating with the equalizer. The device will have an interface to a high-speed communications link, whether a probe or another endpoint.

Figure 2:
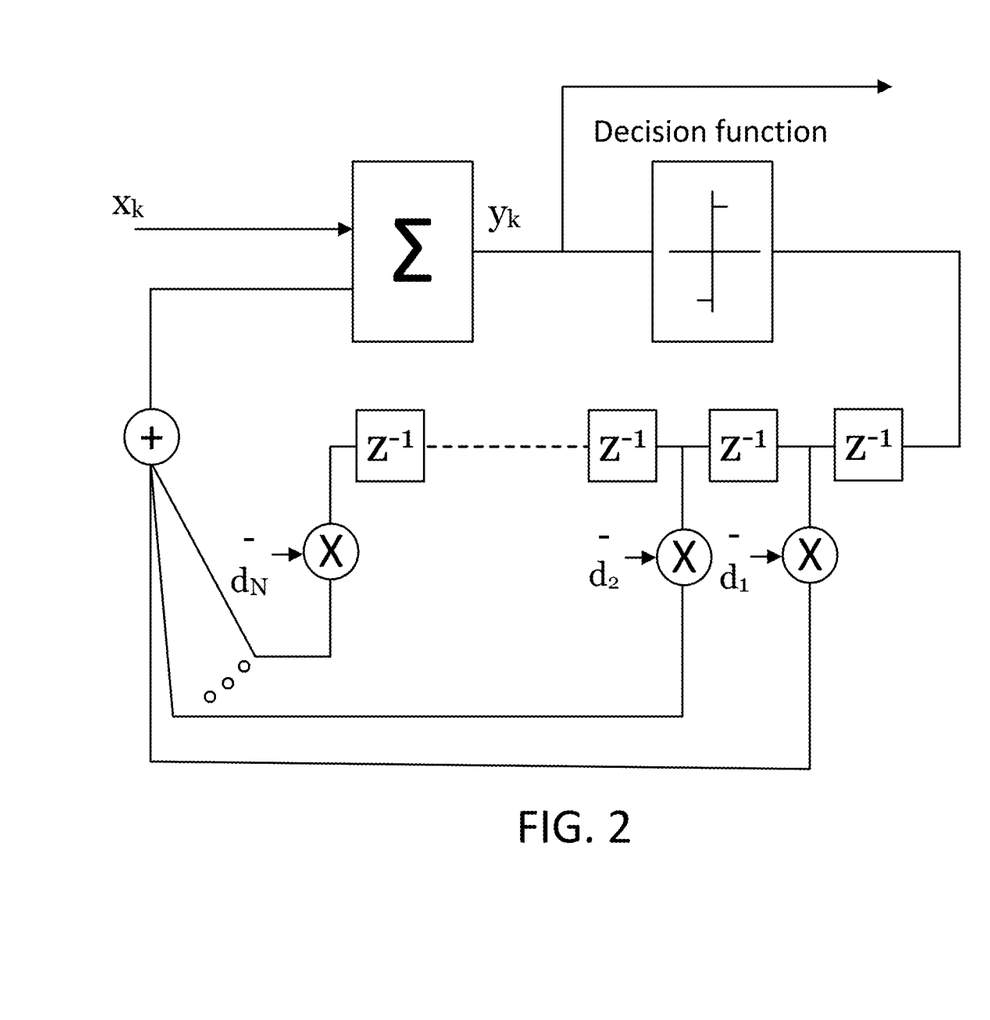
FIG. 2 shows an embodiment of a behavioral decision feedback equalizer architecture.

FIG. 2 shows an embodiment of an N-tap DFE, such as a 16-tap DFE that could be used to comply with PCIE Gen6 standard requirements. As used here, $x_k$ means the input, or input waveform, to the DFE, $y_k$ means the input to the decision function. The decision function detects the symbol in the digital sense. For NRZ (None Return to Zero) signals, the decision function output could be −1, 1, representing bit 0 and bit 1. For PAM4 (Pulse Amplitude Modulation, 4-level) signals, the output could be −1, ⅓, ⅓, 1, representing symbol 0, symbol 1, symbol 2, and symbol 3. The decision function output then feeds into the delay blocks ($z^{-1}$). The delay block outputs are multiplied with corresponding DFE taps $d_i$ and these products are summed, and then fed back to the sum node to get summed with the input signal $x_k$. N designates the number of DFE taps. For PCIE Gen3, N=1. For PCIE Gen6, N=16.

Optimization of the DFE taps improves system performance. Various optimization target functions are used to quantify system performance, including minimum mean squared error (MMSE). PCIE specifications use "eye opening" meaning peak-to-peak values in a waveform, showing an "open eye" in the eye diagram. U.S. Pat. No. 8,855,186, shows an explicit solution for DFE optimization for PCIE Gen3, having a 1-tap DFE. However, when a DFE has two or more taps, the method described in that patent cannot be generalized to get an explicit solution. The embodiments here involve an explicit solution for DFEs with any number of taps with eye opening, as the target performance metric, with constraints on tap values.

In the embodiment of a DFE for PCIE Gen 6, the PCIE Gen6 specification, "PCI Express Base Specification 6.0" (pcisig.com, 2021), provides the equalizer tap constraints. The equalizer tap constraints used here apply specifically to this specification, but the overall method could apply to any type of equalizer tap constraints used in many different communication protocol specifications. In the particular embodiment of PCIE Gen6, the specification provides constraints on the equalizer taps to limit DFE burst errors. A DFE burst error as used here means an error that occurs in several consecutive symbols, as opposed to errors that occur in symbols independently from each other.

In the PCIE Gen6 specification, there are two constraints:

$$d_1/h_0 < 0.55 \quad (1)$$

$$(|d_1|+|d_2|+0.85\times|d_3|+0.60\times|d_4|+0.25\times|d_5|+0.10\times|d_6|+ \\ 0.05\times|d_7|+0.05\times|d_7|+0.05\times|d_8|+0.05\times|d_9|+0.05\times \\ |d_{10}|+0.05\times|d_{11}|+0.05\times|d_{12}|+0.05\times|d_{13}|+0.05\times \\ |d_{14}|+0.05\times|d_{15}|+0.05\times|d_{16}|)/h_0 =< 0.85 \quad (2)$$

As used here, the term $h_0$ means the main cursor of the pulse response extracted from the input waveform to the DFE. The method may use the linear fit pulse extract method, such as that shown in "IEEE 802.3ba 40 Gb/s and 100 Gb/s Ethernet standard," (www.ieee802.org/3/, 2010), to extract the pulse response.

The linear fit pulse extract method, as an example of a way to extract the pulse responses from a waveform, produces a set of impulse responses $h_i$ where i equals the number of coefficients. The term $h_0$ refers to the main impulse response. In this example, the captured waveform results from a transmitter repetitively transmitting a pattern. The captured waveform has an effective sample rate equal to M times the signaling rate of the transmitter. The captured waveform represents an integer number of repetitions of the test pattern totaling N bits. This results in a captured waveform of MN samples. The below method assumes that the first M samples of the waveform corresponds to the first bit of the test pattern, the second M samples to the second bit, etc.

Given such a captured waveform, y(k) and corresponding symbols x(n), one can define an M-by-N waveform matrix, Y, shown below:

$$Y = \begin{bmatrix} y(1) & y(M+1) & \ldots & y(M(N-1)+1) \\ y(2) & y(M+2) & \ldots & y(M(N-1)+2) \\ \vdots & \ldots & \ddots & \vdots \\ y(M) & y(2M) & \ldots & y(MN) \end{bmatrix}$$

One then rotates the symbols vector x by the specified pulse delay $D_p$ to yield $x_i$ as shown below:

$$x_r = [x(Dp+1)x(Dp+2) \ldots x(N)x(1) \ldots x(N-Dp)]$$

Define the matrix X to be an N-by-N matrix derived from $x_r$ as shown below:

$$X = \begin{bmatrix} x_r(1) & x_r(2) & \ldots & x_r(N) \\ x_r(N) & x_r(1) & \ldots & x_r(N-1) \\ \vdots & \ldots & \ddots & \vdots \\ x_r(2) & x_r(3) & \ldots & x_r(1) \end{bmatrix}$$

Define the matrix $X_1$ to be the first $N_p$ rows of X concatenated with a row vector of ones of length N. $N_p$ represents the number of symbols covered within the pulse response. The M-by-($N_p$+1) coefficient matrix, P, corresponding to the line fit is then defined as below. The superscript T denotes the matrix transpose operator.

$$P = YX_1^T(X_1X_1^T)^{-1}$$

$P_1$, then, is defined to be the matrix consisting of the first $N_p$ columns of the matrix P. The linear fit pulse response, p(k), is then read column-wise from the elements of $P_1$.

$$P_1 = \begin{bmatrix} p(1) & p(M+1) & \ldots & p(M(Np-1)+1) \\ p(2) & p(M+2) & \ldots & p(M(Np-1)+2) \\ \vdots & \ldots & \ddots & \vdots \\ p(M) & p(2M) & \ldots & p(MNp) \end{bmatrix}.$$

The resulting linear fit pulse responses, p(k), will be used as $h_i$, where i=1, 2, . . . Np.

Figure 3:
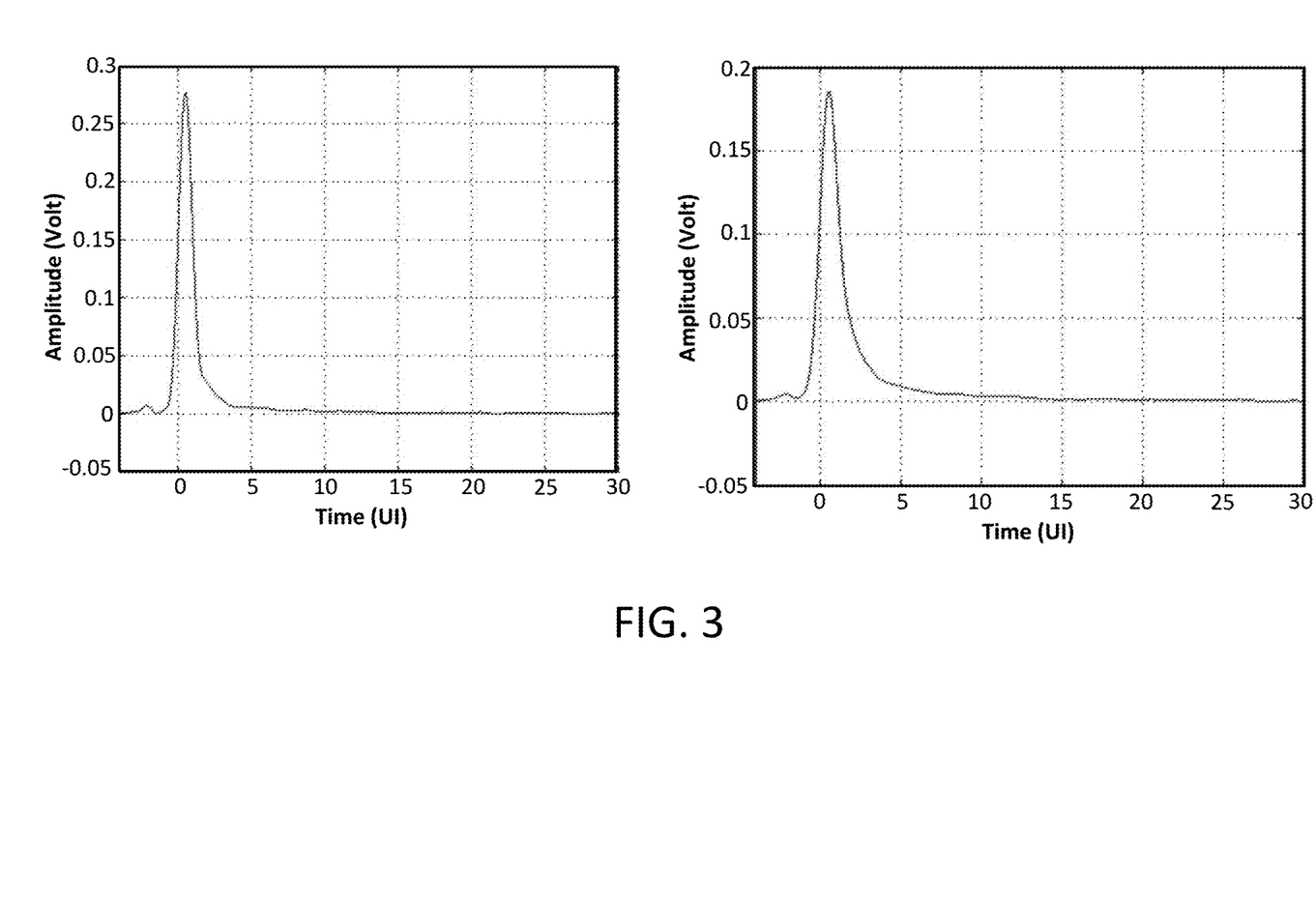
FIG. 3 shows the pulse responses of a signal through a shorter channel and through a longer channel.
Figure 4:
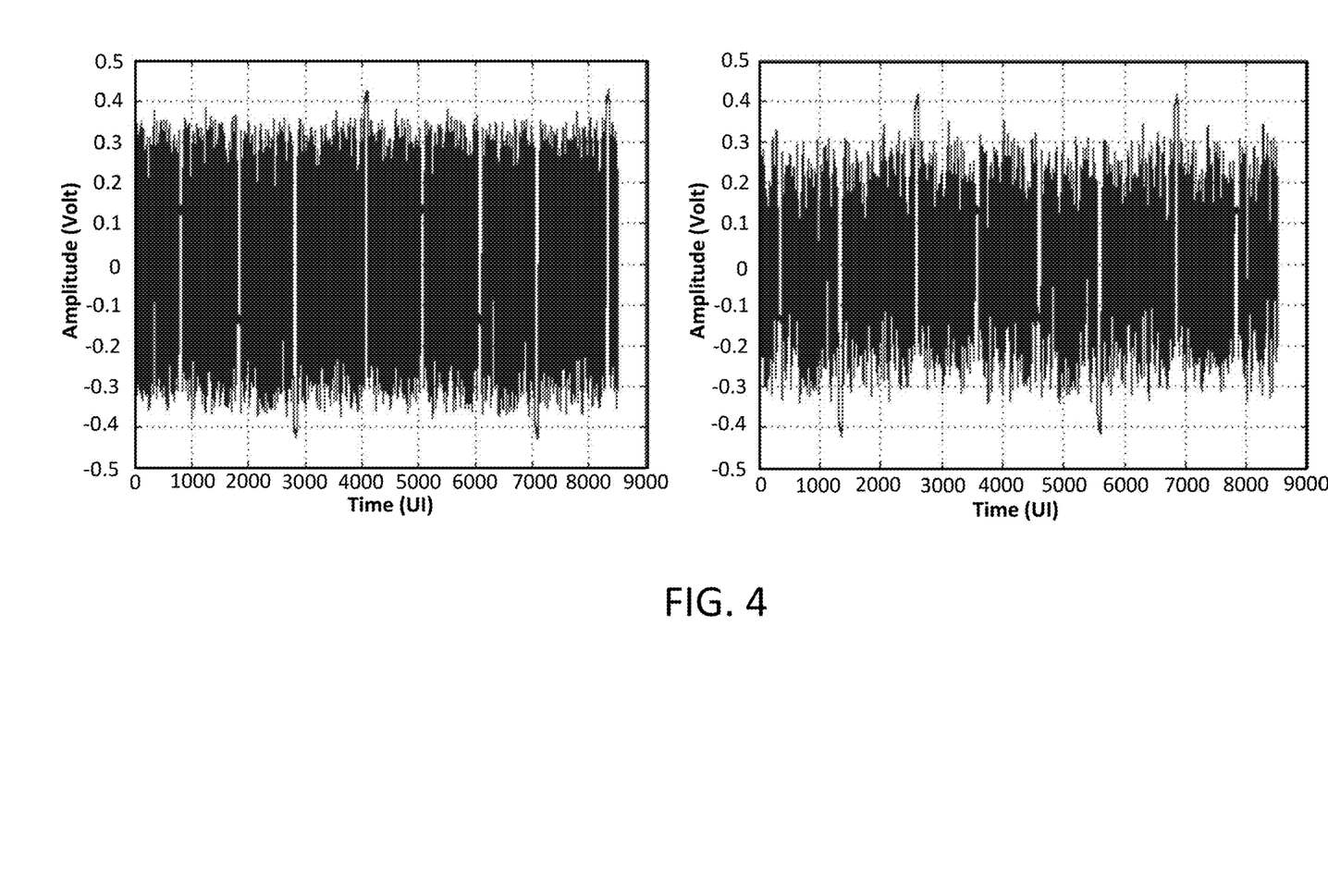
FIG. 4 shows waveforms of a signal through a shorter channel and through a longer channel.
Figure 5:
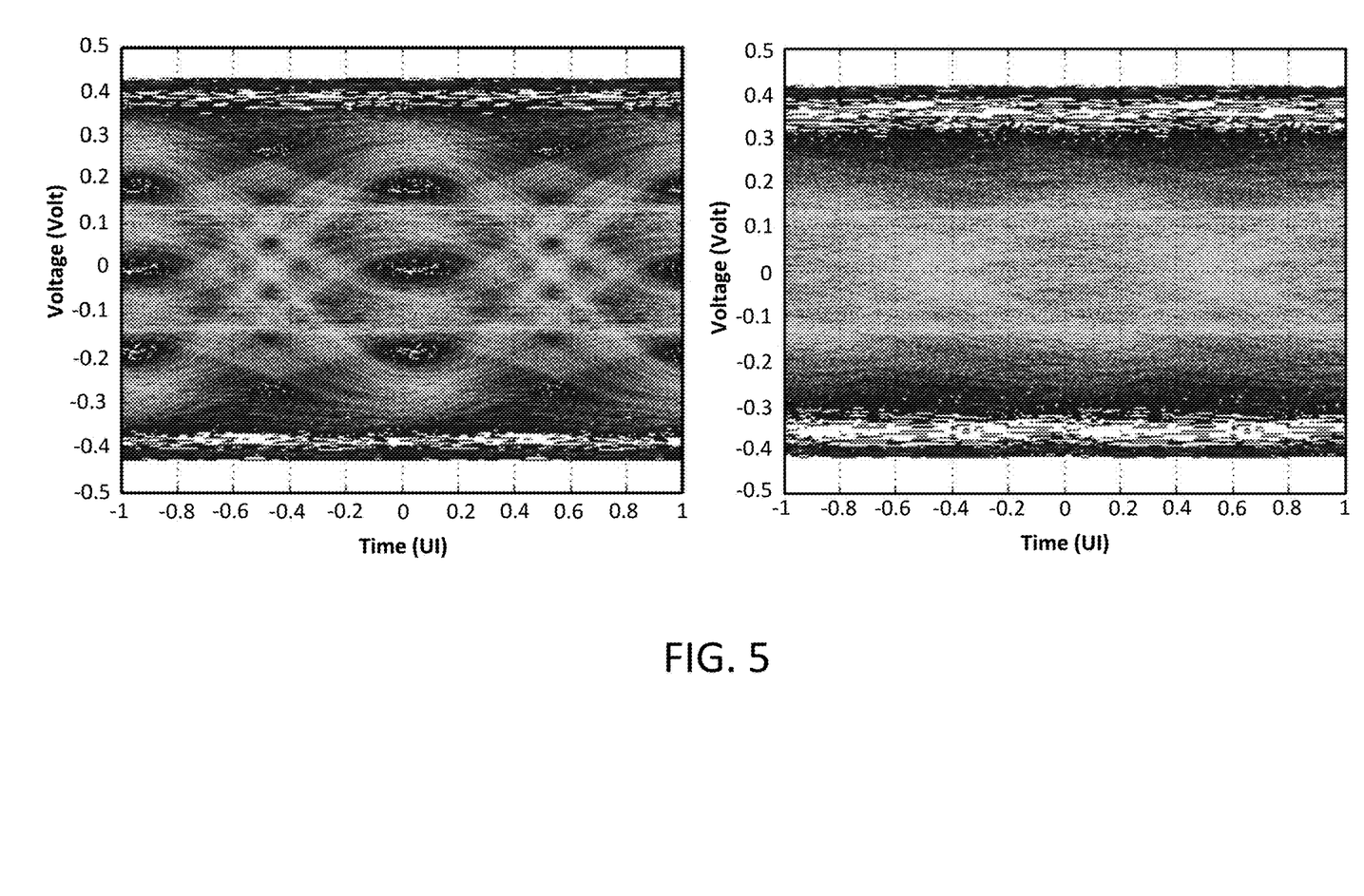
FIG. 5 shows eye diagrams of a signal through a shorter channel and through a longer channel.

The linear fit pulse extract method above can extract the pulse response. FIG. 3 shows the pulse responses from a signal through a shorter channel, on the left, and through a longer channel, on the right. FIG. 4 shows the corresponding waveforms of the signal through the shorter channel, on the left, and through the longer channel, on the right. The pulse response from the signal through the longer channel has a lower main cursor $h_0$ and longer decay than the pulse response from the signal through the shorter channel. This indicates larger inter-symbol interference (ISI), resulting in more eye closure as shown in FIG. 5, with the eye diagram of the signal through the shorter channel on the left, and the eye diagram of the signal through the longer channel on the right.

Considering how the post cursors impact the following symbols and cause eye closures, the eye opening optimization problem can be translated to the following optimization problem:

$$\min (\Sigma_{i=1}^N (|h_i - d_i|)) \quad (3)$$

with constraints (1) and (2).

The weighting parameters from constraint (2) can define a parameter set, K, where K=[1 1 0.85 0.60 0.25 0.10 0.05

0.05 0.05 0.05 0.05 0.05 0.05 0.05 0.05 0.05]. This allows constraint (2) to be rewritten as:

$$\Sigma_{i=1}^{N}(k_i \times |d_i|) < 0.85 \times h_0$$

If one denotes $c_i = |d_i|$, the optimization problem of (3) translates to the following optimization problem:

$$\max(J(c_i)) \text{ where } J(c_i) = \Sigma_{i=1}^{N}(c_i) \quad (4)$$

The problem (4) has constraints (5), (6), and (7):

$$c_1 < 0.55 \times h_0 \quad (5)$$

$$G(c_i) = \Sigma_{i=1}^{N}(k_i \times c_i) < 0.85 \times h_0 \quad (6)$$

$$0 \leq c_i \leq |h_i| \quad (7)$$

One can pick an index, j so that $k_j$ is less or equal to the rest of $k_i$, $i \in [1\ N]$. This step can be performed by sorting the $k_i$ to get the index.

$$G(c_i) = \Sigma_{i=1}^{N}(k_i \times c_i) \geq \Sigma_{i=1}^{N}(k_j \times c_i) = k_j \times \Sigma_{i=1}^{N}(c_i) = k_j \times J(c_i) \quad (8)$$

Note that the inequality (8) connects the optimization cost function J and the constraint function G. The optimal value for $c_j$ is $$c_j = \min\left((0.85 \times h_0 - \Sigma_{i=1, i \neq j}^{N}(k_i \times c_i))/k_j, |h_j|\right) j \neq 1 \quad (9)$$

For j=1, the constraint (5) also needs to be considered $$c_j = \min\left((0.85 \times h_0 - \Sigma_{i=1, i \neq j}^{N}(k_i \times c_i))/k_j, |h_j|, 0.55 \times h_0\right) j = 1 \quad (10)$$

As an example, assume that the sixth term of the parameter set K is currently the smallest value. This sets j to 6, so $k_j = k_6$ in the above equations. The value of j is not 1, so the process uses equation (9) to determine the value of $c_6$. All of the values $c_i$ are initialized to 0. This leads to the value of $c_6$ to be the minimum of $(0.85 \times h_0)/k_6$, or the absolute value of the pulse response $h_6$. This is because the summation term is zero, as all of the $c_i$ terms are initially zero. This results in the value being the minimum of the first term, $0.85 \times h_0/k_6$, and the absolute value of the pulse response $h_6$. Once that term is placed into the set $c_i$, the next smallest value in the K parameter set is used and the process repeats until the set $c_i$ is filled, where the equation (10) is used for when j=1.

Once the set $c_i$ is completed, the DFE tap values can be determined by:

$$d_i = \text{sign}(h_i) \times c_i\ i=1,2,\ldots,N \quad (11)$$

In summary, the method comprises calculating the pulse response from the input waveform to the equalizer to find both $h_0$ and $h_i$, where i corresponds to the number of taps. The set of pulse responses $h_i$, the set of values, $c_i$, and the set of parameters will all have the same number of elements. These will be referred to as the corresponding ones of each set.

For the particular embodiment used to demonstrate the methodology, i is from 1 to Np. All the values of the set, $c_i$, are initialized to zero. An index, j, is used for selecting the current smallest of lowest of the set of the parameters K, where j is the index, or position, of the smallest term in the set of parameters, K. As each value in the set of values is found, the current lowest parameter in the set of parameters will move to the next lowest parameter, as each parameter is used only once.

The process then determines the value of $c_j$ according to one of either equations (9) or (10). One should note that determining a minimum value between a first term in the set of given parameters in PCIE Gen6 means that first term is 0.85. This first term is then multiplied by a main pulse response $h_0$. A summation of each parameter $k_i$ in the set of parameters multiplied by each value in the set of values $c_i$ divided by the current lowest parameter $k_j$ is then subtracted from the previous product. The minimum between this value and the absolute value of the corresponding pulse response $h_i$. For the case when j=1, the values from which the minimum value is selected includes an addition term of 0.55 times the main pulse response, $h_0$. This value comes from the first constraint where $d_1/h_0 < 0.55$.

Figure 6:
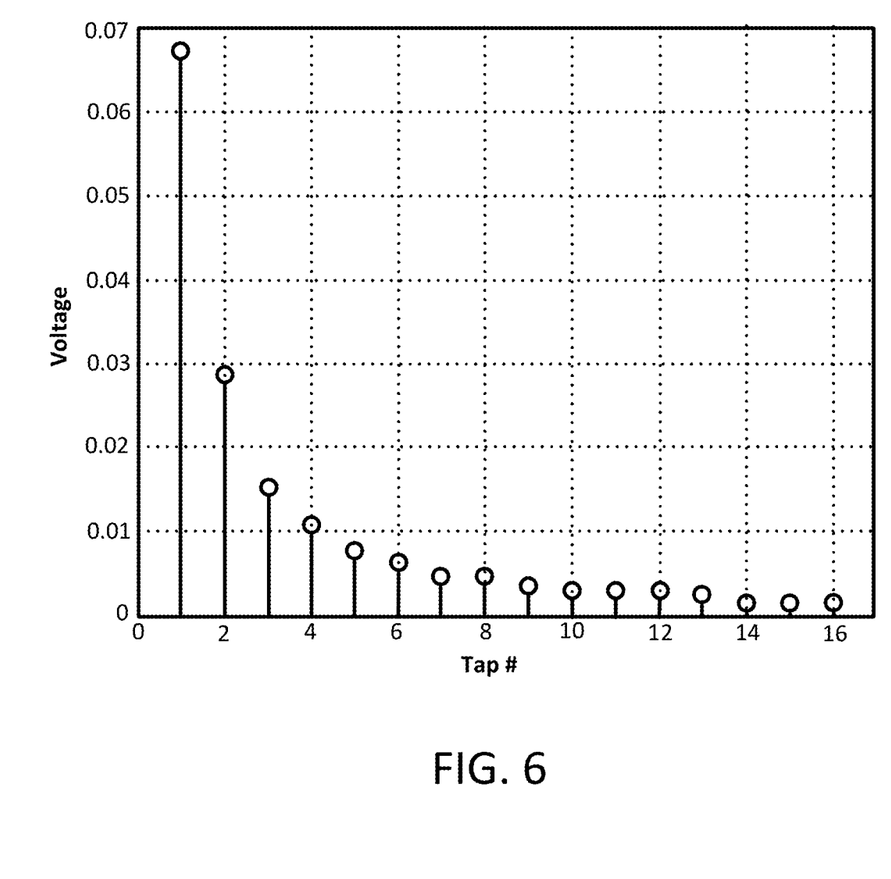
FIG. 6 shows a graphical representation of equalizer taps.
Figure 7:
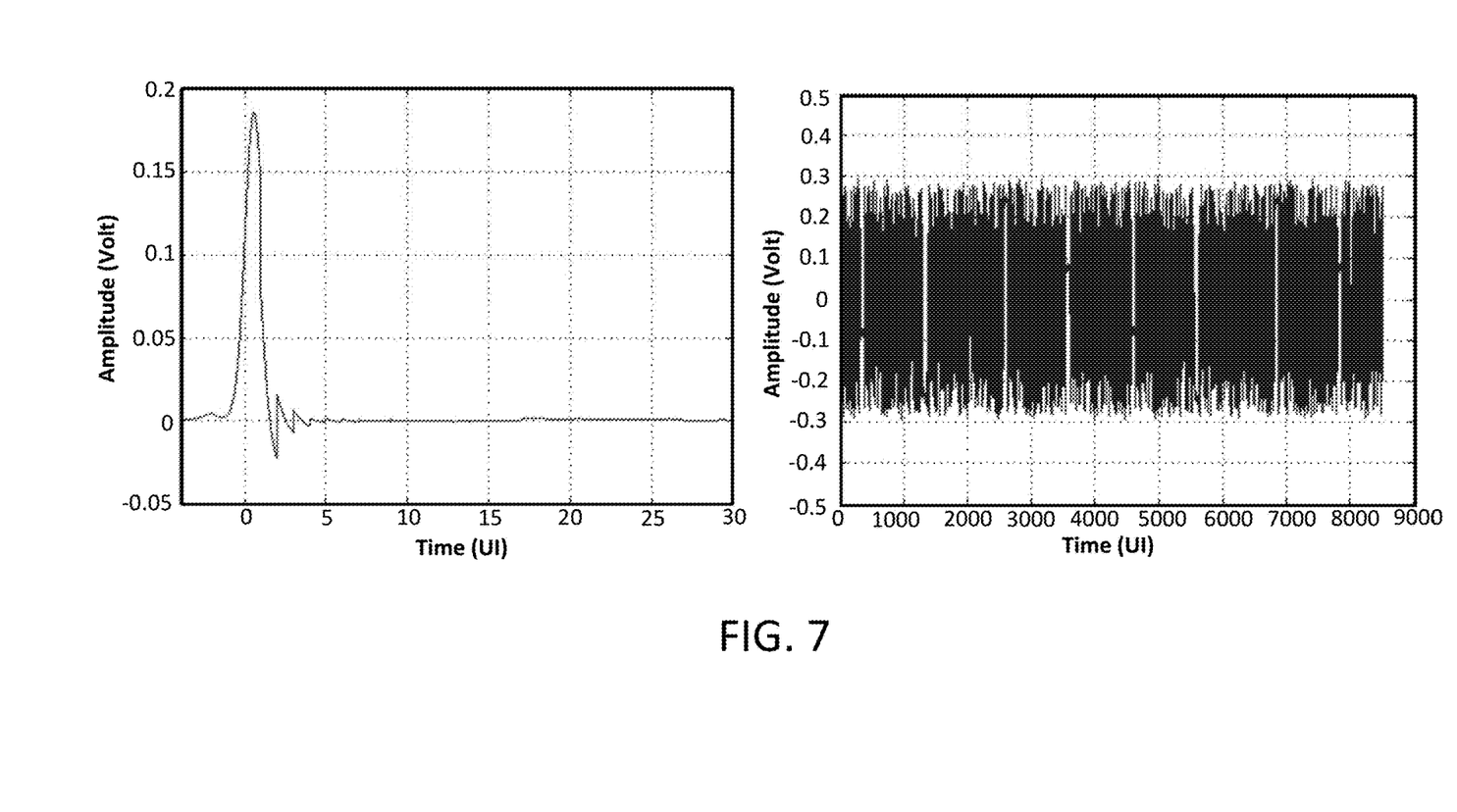
FIG. 7 shows graphs of signals after equalization for the longer channel.
Figure 8:
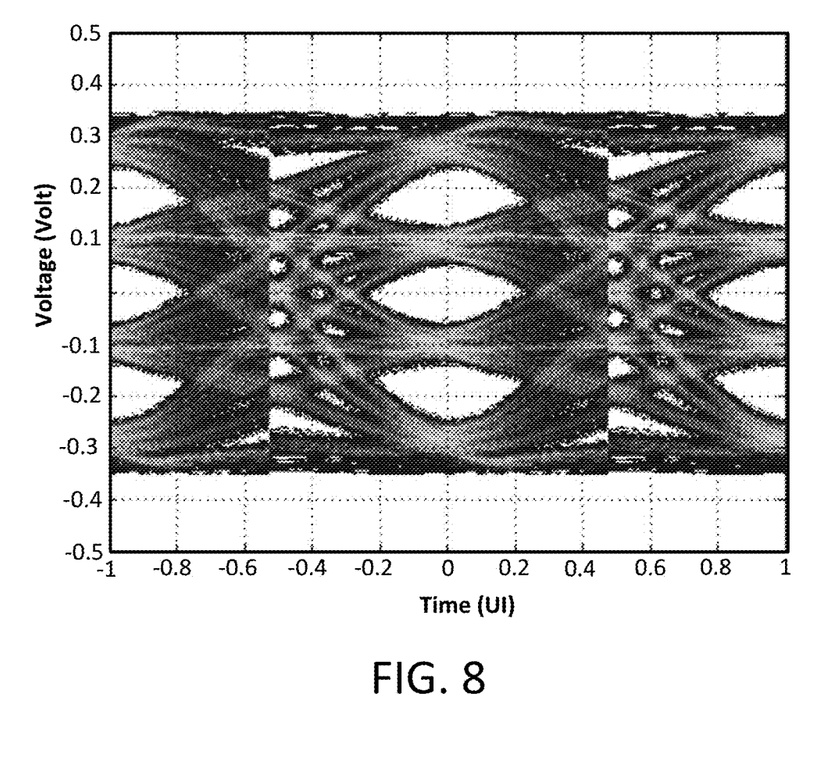
FIG. 8 shows post equalizer eye diagram after the longer channel.

FIG. 6 shows the resulting DFE taps for the longer channel. FIG. 7, on the left, shows the pulse response of the signal after the application of the DFE for the longer channel. Note that the post cursors, $h_i$, are pushed closer to zero at the symbol sample locations. FIG. 7, on the right, shows that the DFE reduces the impact of the ISI, the post DFE waveform. As shown in FIG. 8, the DFEs result in the opened eye diagrams.

The PCIE Gen6 is used to describe the explicit solution for DFE tap optimization with tap constraints problem. The method can be applied to a variety of DFE tap optimization with tap constraints problems. In some applications, the horizontal sample location in the unit interval can be adjusted. In this case, the main cursor $h_0$ can be picked and measured at different allowed sample locations in the unit interval within the main cursor. The explicit solution can be used to perform DFE tap optimization for each of horizontal sample locations. The explicit solution (9) and (10) uses the "≤" instead of the strict "<" in constraints (5) and (6). To meet the strict constraints, a small negative value ε can be added to $h_0$ in the solution (9) and (10).

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), field programmable gate arrays (FPGAs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is a method of equalizing a communication link, comprising: setting a number of coefficients equal to a required number of coefficients; determining a number of pulse responses for a waveform, the number of pulse responses being greater than the number of coefficients; setting all values in a set of values to zero, the set of values having a number of values equal to the number of coefficients; repeating, until all values in the set of values have been assigned: determining a current lowest parameter in a set of given parameters; using a position of the current lowest parameter in the set of given parameters as an index; determining a minimum value between a first term in the set of given parameters multiplied by a main pulse response minus a summation of each parameter in the set of parameters multiplied by each value in the set of values, divided by the current lowest parameter, and a corresponding pulse response; and assigning the minimum value to the value in the set of values having a position equal to position of the current lowest parameter; and determining a value of each coefficient in a set of coefficients by multiplying each value in the set of values with the sign of a corresponding pulse response in the number of pulse responses; defining an equalizer having a number of taps equal to the number of coefficients, each tap having a value based on the corresponding coefficient; and applying the equalizer to a waveform received through the communication link to produce an equalized waveform.

Example 2 is the method of Example 1, wherein determining a number of pulse responses comprises using linear fit pulse response extraction.

Example 3 is the method of either of Examples 1 or 2, wherein the given set of parameters results from a required constraint on the equalizer.

Example 4 is the method of any of Examples 1 through 3, wherein determining the minimum value comprises determining the minimum value using an additional term based upon the main pulse response when the index is equal to 1.

Example 5 is the method of Example 4, wherein the additional term is based upon an equalizer tap constraint on the equalizer.

Example 6 is the method of any of Examples 1 through 5, wherein the communication link comprises one of Peripheral Component Interface Express (PCIE) Gen6, and Universal Serial Bus (USB).

Example 7 is the method of any of Examples 1 through 5, wherein the required number of coefficients is 16.

Example 8 is a computing device, comprising: an interface to a high-speed communications link; and one or more processors configured to execute code, that when executed to cause the one or more processors to: set a number of coefficients equal to a required number of coefficients; determine a number of pulse responses for a waveform, the number of pulse responses being greater than the number of coefficients; set all values in a set of values to zero, the set of values having a number of values equal to the number of coefficients; repeat, until all values in the set of values have been assigned: determine a current lowest parameter of a set of given parameters; use a position of the current lowest parameter in the set of given parameters as an index; determine a minimum value between a first term in the set of given parameters multiplied by a main pulse response minus a summation of each parameter in the set of parameters multiplied by each value in the set of values, divided by the current lowest parameter, and a corresponding pulse response; and assign the minimum value to the value in the set of values having a position equal to the position of the current lowest parameter in the set of given parameters; and determine a value of each coefficient in a set of coefficients by multiplying each value in the set of values with the sign of a corresponding pulse response in the number of pulse responses; define an equalizer having a number of taps equal to the number of coefficients, each tap having a value based on the corresponding coefficient; and apply the equalizer to a waveform received through the communication link to produce an equalized waveform.

Example 9 is the device of Example 8, wherein the code that causes the one or more processors to determine a number of pulse responses comprises code that causes the one or more processor to use linear fit pulse response extraction.

Example 10 is the device of either of Examples 8 or 9, wherein the given set of parameters results from a required constraint on the equalizer.

Example 11 is the device of any of Examples 8 through 10, wherein the code that causes the one or more processors to determine the minimum value comprises code to cause the one or more processors to determine the minimum value using an additional term based upon the main pulse response when the index is equal to 1.

Example 12 is the device of Example 11, wherein the additional term is based upon an equalizer tap constraint on the equalizer.

Example 13 is the device of any of Examples 8 through 12, wherein the communication link comprises one of PCIE Gen6, and USB.

Example 14 is the device of Examples 8 through 13, wherein the required number of coefficients is 16.

Example 15 is a method of optimizing a 16-tap equalizer for a communication link, comprising: determining a number of pulse responses for a waveform, the number of pulse responses being greater than 16; setting all values in a set of 16 values to zero; repeating, until all 16 values in the set of values have been assigned: determining a current lowest parameter of a set of 16 given parameters; using a position of the current lowest parameter as an index; determining a minimum value between a first term in the set of given parameters multiplied by a main pulse response minus a summation of each parameter in the set of parameters multiplied by each value in the set of values, divided by the current lowest parameter, and a corresponding pulse response; and assigning the minimum value to the value in the set of values having a position equal to the position of the current lowest parameter; and determining a value of each coefficient in a set of coefficients by multiplying each value in the set of values with the sign of a corresponding pulse response in the number of pulse responses.

Example 16 is the method of Example 15, wherein determining the number of pulse responses comprises using linear fit pulse response extraction.

Example 17 is the method of either of Examples 15 or 16, wherein determining the minimum value comprises determining the minimum value using an additional term based upon the main pulse response when the index is equal to 1.

Example 18 is the method of any of Examples 15 through 17, wherein the given set of parameters result from a required constraint on the equalizer.

Example 19 is the method of any of Examples 15 through 18, wherein the given set of parameters comprises [1 1 0.85 0.60 0.25 0.10 0.05 0.05 0.05 0.05 0.05 0.05 0.05 0.05 0.05 0.05].

Example 20 is the method of any of Examples 15 through 19, further comprising defining the 16-tap equalizer with each tap having a value based on the corresponding coefficient; and applying the equalizer to a waveform received through the communication link to produce an equalized waveform.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific embodiments have been illustrated and described for purposes of illustration, it will be understood that various modifications may be made without departing from the spirit and scope of the disclosure. Accordingly, the invention should not be limited except as by the appended claims.

I claim:

1. A method of equalizing a communication link, comprising:
   setting a number of coefficients equal to a required number of coefficients;
   determining a number of pulse responses for a waveform, the number of pulse responses being greater than the number of coefficients;
   setting all values in a set of values to zero, the set of values having a number of values equal to the number of coefficients;
   repeating, until all values in the set of values have been assigned:
      determining a current lowest parameter in a set of given parameters;
      using a position of the current lowest parameter in the set of given parameters as an index;
      determining a minimum value between a first term in the set of given parameters multiplied by a main pulse response minus a summation of each parameter in the set of given parameters multiplied by each value in the set of values, divided by the current lowest parameter, and a corresponding pulse response; and
      assigning the minimum value to a value in the set of values having a position equal to the position of the current lowest parameter;
   determining a value of each coefficient in a set of coefficients by multiplying each value in the set of values with the sign of a corresponding pulse response in the number of pulse responses;
   defining an equalizer having a number of taps equal to the number of coefficients in the set of coefficients, each tap having a value based on a corresponding coefficient in the set of coefficients; and
   applying the equalizer to a waveform received through the communication link to produce an equalized waveform.

2. The method as claimed in claim 1, wherein determining the number of pulse responses comprises using linear fit pulse response extraction.

3. The method as claimed in claim 1, wherein the given set of parameters results from a required constraint on the equalizer.

4. The method as claimed in claim 1, wherein determining the minimum value comprises determining the minimum value using an additional term based upon the main pulse response when the index is equal to 1.

5. The method as claimed in claim 4, wherein the additional term is based upon an equalizer tap constraint on the equalizer.

6. The method as claimed in claim 1, wherein the communication link comprises one of Peripheral Component Interface Express (PCIE) Gen6, and Universal Serial Bus (USB).

7. The method as claimed in claim 1, wherein the required number of coefficients is 16.

8. A computing device, comprising:
   an interface coupled to a high-speed communication link; and
   one or more processors configured to execute code, that when executed causes the one or more processors to:
      set a number of coefficients equal to a required number of coefficients;
      determine a number of pulse responses for a waveform, the number of pulse responses being greater than the number of coefficients;
      set all values in a set of values to zero, the set of values having a number of values equal to the number of coefficients;
      repeat, until all values in the set of values have been assigned:

determine a current lowest parameter of a set of given parameters;

use a position of the current lowest parameter in the set of given parameters as an index;

determine a minimum value between a first term in the set of given parameters multiplied by a main pulse response minus a summation of each parameter in the set of given parameters multiplied by each value in the set of values, divided by the current lowest parameter, and a corresponding pulse response; and assign the minimum value to a value in the set of values having a position equal to the position of the current lowest parameter in the set of given parameters;

determine a value of each coefficient in a set of coefficients by multiplying each value in the set of values with the sign of a corresponding pulse response in the number of pulse responses;

define an equalizer having a number of taps equal to the number of coefficients in the set of coefficients, each tap having a value based on a corresponding coefficient in the set of coefficients; and apply the equalizer to a waveform received through the high-speed communication link to produce an equalized waveform.

9. The device as claimed in claim 8, wherein the code that causes the one or more processors to determine the number of pulse responses comprises code that causes the one or more processor to use linear fit pulse response extraction.

10. The device as claimed in claim 8, wherein the given set of parameters results from a required constraint on the equalizer.

11. The device as claimed in claim 8, wherein the code that causes the one or more processors to determine the minimum value comprises code to cause the one or more processors to determine the minimum value using an additional term based upon the main pulse response when the index is equal to 1.

12. The device as claimed in claim 11, wherein the additional term is based upon an equalizer tap constraint on the equalizer.

13. The device as claimed in claim 8, wherein the high-speed communication link comprises one of Peripheral Component Interface Express (PCIE) Gen6, and Universal Serial Bus (USB).

14. The device as claimed in claim 8, wherein the required number of coefficients is 16.

15. A method of optimizing a 16-tap equalizer for a communication link, comprising:

determining a number of pulse responses for a waveform, the number of pulse responses being greater than 16;

setting all values in a set of 16 values to zero;

repeating, until all 16 values in the set of values have been assigned:

determining a current lowest parameter of a set of 16 given parameters;

using a position of the current lowest parameter as an index;

determining a minimum value between a first term in the set of 16 given parameters multiplied by a main pulse response minus a summation of each parameter in the set of 16 given parameters multiplied by each value in the set of 16 values, divided by the current lowest parameter, and a corresponding pulse response; and assigning the minimum value to a value in the set of 16 values having a position equal to the position of the current lowest parameter; and determining a value of each coefficient in a set of coefficients by multiplying each value in the set of 16 values with the sign of a corresponding pulse response in the number of pulse responses.

16. The method as claimed in claim 15, wherein determining the number of pulse responses comprises using linear fit pulse response extraction.

17. The method as claimed in claim 15, wherein determining the minimum value comprises determining the minimum value using an additional term based upon the main pulse response when the index is equal to 1.

18. The method as claimed in claim 15, wherein the given set of 16 parameters result from a required constraint on the 16-tap equalizer.

19. The method as claimed in claim 15, wherein the given set of 16 parameters comprises [1 1 0.85 0.60 0.25 0.10 0.05 0.05 0.05 0.05 0.05 0.05 0.05 0.05 0.05 0.05].

20. The method as claimed in claim 15, further comprising:

defining the 16-tap equalizer with each tap having a value based on a corresponding coefficient in the set of coefficients; and applying the 16-tap equalizer to a waveform received through the communication link to produce an equalized waveform.

* * * * *